(12) United States Patent
Haskin et al.

(10) Patent No.: US 8,529,249 B2
(45) Date of Patent: Sep. 10, 2013

(54) FLAME HOLDER SYSTEM

(75) Inventors: Henry H. Haskin, Newport News, VA (US); Peter Vasquez, Gloucester, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 901 days.

(21) Appl. No.: 11/860,703

(22) Filed: Sep. 25, 2007

(65) Prior Publication Data

US 2009/0081601 A1 Mar. 26, 2009

(51) Int. Cl.
*F23D 14/46* (2006.01)

(52) U.S. Cl.
USPC ........... 431/353; 431/350; 431/354; 285/396; 285/402; 239/600; 403/319

(58) Field of Classification Search
USPC ................. 431/159, 181, 345, 350, 353, 354, 431/355; 285/361, 376, 396, 402; 239/589, 239/600, 148.21; 403/319; 220/301
See application file for complete search history.

(56) References Cited

U.S. PATENT DOCUMENTS

| | | | | | |
|---|---|---|---|---|---|
| 28,694 | A | * | 6/1860 | Smith | 239/589 |
| 263,415 | A | * | 8/1882 | Lightburne, Jr. | 285/8 |
| 794,539 | A | * | 7/1905 | O'Brien | 285/89 |
| 906,217 | A | * | 12/1908 | Gaylord | 285/391 |
| 919,743 | A | * | 4/1909 | Mason | 285/361 |
| 931,327 | A | * | 8/1909 | Manzel | 279/93 |
| 1,130,726 | A | * | 3/1915 | Greve | 285/376 |
| 1,132,969 | A | | 3/1915 | Paul | |
| 1,307,273 | A | * | 6/1919 | Salley | 285/361 |
| 1,390,264 | A | * | 9/1921 | Allen et al. | 239/117 |
| 1,622,216 | A | * | 3/1927 | Anlauf et al. | 285/88 |
| 1,646,456 | A | * | 10/1927 | Noreen et al. | 239/416.4 |
| 1,670,147 | A | * | 5/1928 | Gault, Jr. | 431/353 |
| 1,738,893 | A | * | 12/1929 | Grady | 220/301 |
| 1,845,882 | A | * | 2/1932 | Litschge | 285/361 |
| 2,148,535 | A | * | 2/1939 | Cone | 239/390 |
| 2,368,370 | A | * | 1/1945 | Maxon, Jr. | 431/249 |
| 2,437,180 | A | * | 3/1948 | Allen | 439/277 |
| 2,496,264 | A | | 2/1950 | Benson | |
| 2,562,505 | A | * | 7/1951 | Mueller | 239/283 |
| 2,598,009 | A | * | 5/1952 | Peeps | 251/149.5 |

(Continued)

FOREIGN PATENT DOCUMENTS

| | | | |
|---|---|---|---|
| GB | 2125501 A | * | 3/1984 |
| GB | 2155985 A | * | 10/1985 |
| JP | 59231313 A | * | 12/1984 |
| WO | WO 02098195 A1 | * | 12/2002 |

*Primary Examiner* — Kang Hu
*Assistant Examiner* — John C Hailey, III
(74) *Attorney, Agent, or Firm* — Robin W. Edwards; Helen M. Galus

(57) ABSTRACT

A flame holder system includes a modified torch body and a ceramic flame holder. Catch pin(s) are coupled to and extend radially out from the torch body. The ceramic flame holder has groove(s) formed in its inner wall that correspond in number and positioning to the catch pin(s). Each groove starts at one end of the flame holder and can be shaped to define at least two 90° turns. Each groove is sized to receive one catch pin therein when the flame holder is fitted over the end of the torch body. The flame holder is then manipulated until the catch pin(s) butt up against the end of the groove(s).

7 Claims, 2 Drawing Sheets

(56) References Cited

U.S. PATENT DOCUMENTS

| | | | |
|---|---|---|---|
| 2,647,568 A * | 8/1953 | Sloan | 431/183 |
| 3,215,098 A * | 11/1965 | Nelson | 431/356 |
| 3,227,202 A * | 1/1966 | Morgan | 431/353 |
| 3,364,704 A * | 1/1968 | Bernstein | 431/28 |
| 3,512,912 A * | 5/1970 | Linch | 431/344 |
| 3,612,037 A | 10/1971 | Spiggle | |
| 3,627,460 A * | 12/1971 | Gilman | 431/111 |
| 3,663,154 A * | 5/1972 | Locke | 431/353 |
| 3,861,858 A * | 1/1975 | Hemsath et al. | 431/353 |
| 3,905,755 A * | 9/1975 | Aske | 431/344 |
| 4,025,292 A * | 5/1977 | Bailey et al. | 431/353 |
| 4,071,195 A * | 1/1978 | Kuhns et al. | 239/289 |
| 4,469,932 A * | 9/1984 | Spiegelberg et al. | 219/121.37 |
| 4,527,745 A * | 7/1985 | Butterfield et al. | 239/600 |
| 4,746,149 A * | 5/1988 | Thompson | 285/148.13 |
| 4,780,370 A * | 10/1988 | Pointier | 428/404 |
| 4,936,511 A * | 6/1990 | Johnson et al. | 239/346 |
| 660,550 A * | 10/1990 | Beese | 431/109 |
| 5,087,086 A * | 2/1992 | Snedeker | 285/361 |
| D326,507 S * | 5/1992 | Rowley | D23/260 |
| 5,137,189 A * | 8/1992 | Hall et al. | 222/603 |
| 5,199,649 A * | 4/1993 | Tolboll | 239/600 |
| 5,249,958 A * | 10/1993 | Freber | 431/354 |
| 5,487,507 A * | 1/1996 | McDonald et al. | 239/391 |
| 5,741,084 A * | 4/1998 | Del Rio et al. | 403/349 |
| 6,209,807 B1 * | 4/2001 | Hsin-Fa | 239/600 |
| 6,730,218 B2 * | 5/2004 | Bozenmayer | 210/232 |
| 7,029,272 B2 * | 4/2006 | Jordan et al. | 431/278 |
| 7,175,423 B1 * | 2/2007 | Pisano et al. | 431/10 |
| 8,114,202 B2 * | 2/2012 | Burke et al. | 96/203 |
| 8,359,746 B2 * | 1/2013 | Burke et al. | 29/890.051 |
| 2003/0034651 A1 * | 2/2003 | Neubauer et al. | 285/396 |
| 2005/0003317 A1 * | 1/2005 | Mizuno et al. | 431/345 |
| 2007/0236018 A1 * | 10/2007 | Husmann et al. | 285/401 |

* cited by examiner

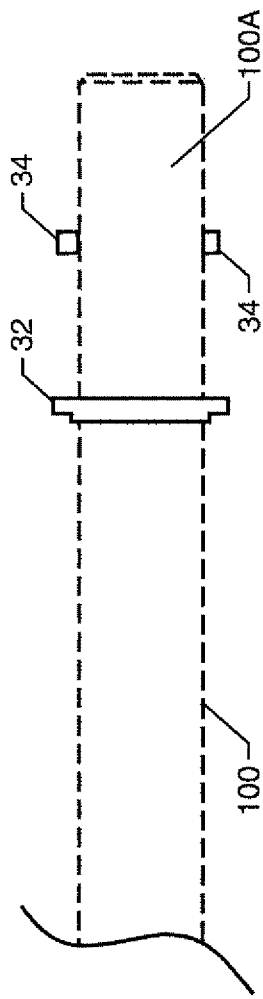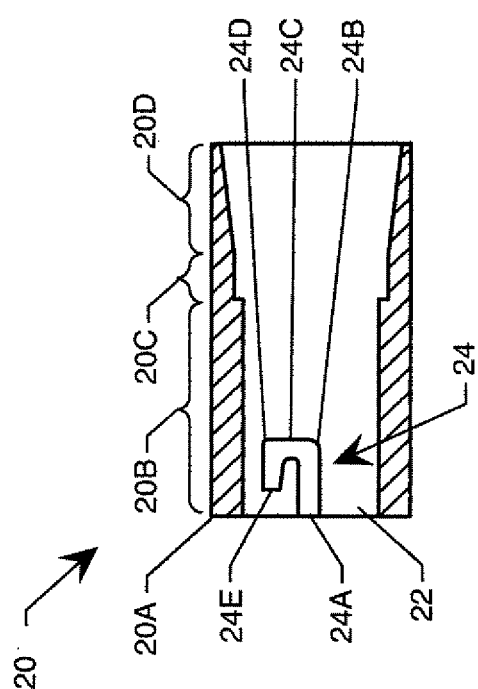
FIG. 2
FIG. 3

FLAME HOLDER SYSTEM

ORIGIN OF THE INVENTION

The invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to high temperature torches. More specifically, the invention is a flame holder systems for use with high temperature torches.

2. Description of the Related Art

Propane torches, or burners, typically have a hollow torch body that is finished with a hollow nozzle or "flame holder" as it is known. Existing flame holders are generally made from stainless steel, cast iron or, in some cases, a ceramic material such as alumina oxide. Stainless steel flame holders are attached using set screws that pass radially through the flame holder to engage the outer wall of the torch body. Ceramic flame holders are bonded (e.g., using a ceramic adhesive) to the torch body.

Existing flame holders present problems in applications requiring high temperature operation and/or extended operation times. Flame holders made from metal oxidize quickly on the outer walls thereof and subsequently experience spalling or flaking. If the operating temperatures are high enough, metallic flame holders will melt thereby requiring replacement of the flame holder. However, when the flame holder melts, it is difficult or impossible to disengage the set screws, in which case the whole torch is often discarded. Existing ceramic flame holders tend to work well at continuous high temperature burns, but tend to crack and/or fall apart if used in applications requiring multiple burn cycles such chat the flame holder cools between burns. When this happens, the ceramic flame holder must be removed. Since the ceramic flame holder is bonded to the torch body, any ceramic still bonded to the torch body must be chipped or abraded off before a new flame holder can be installed. This can cause hours to days of unscheduled maintenance. Accordingly, it is not uncommon for a perfectly good torch to be discarded simply because of a damaged ceramic flame holder.

SUMMARY OF THE INVENTION

Accordingly, it is an object of the present invention to provide a flame holder system suitable for use in continuous-burn and cycled-burn applications.

Another object of the present invention is to provide a flame holder system that facilitates easy attachment and replacement of a flame holder to a torch body.

Other objects and advantages of the present invention will become more obvious hereinafter in the specification and drawings.

In accordance with at least one embodiment of the present invention, a flame holder system includes a modified torch body and a ceramic flame holder (e.g., made from a zirconium oxide castable compound). At least one catch pin is coupled to the torch body near an outboard end thereof. Each such catch pin extends radially outward from the torch body. The ceramic flame holder is bored therethrough from a first end to a second end thereof to define an inner wail with the first end adapted to fit over the outboard end of the torch body but not the catch pins. The flame holder has one or more grooves formed in its inner wall where the grooves correspond in number and positioning to the catch pin(s). Each groove starts at the first end of the flame holder and is shaped to define at least two 90° turns. Each groove is sized to receive a catch pin therein when the flame holder is fitted over the outboard end of the torch body. The flame holder is then manipulated until the catch pin(s) butt up against the end of the groove(s).

BRIEF DESCRIPTION OF THE DRAWINGS

FIG. 2 is a side view of modifications to a torch body in accordance with the present invention;

FIG. 3 is a cross-sectional view of a flame holder in accordance with an embodiment of the present invention; and FIG. 4 is a perspective view of a flame holder system in accordance with another embodiment of the present invention.

DETAILED DESCRIPTION OF THE INVENTION

Figure 1:
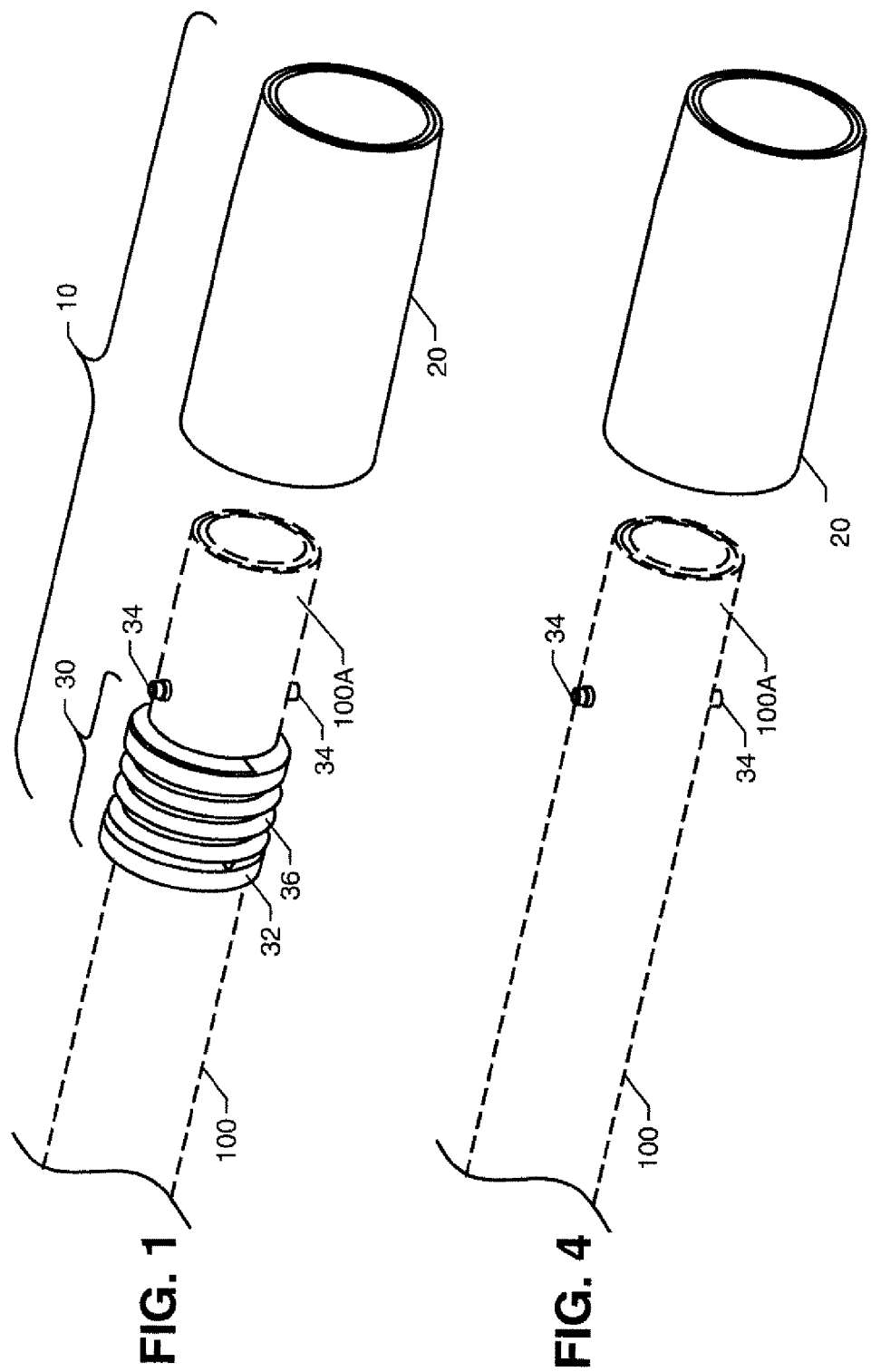
FIG. 1 is a perspective view of a flame holder system in accordance with an embodiment of the present invention.

Referring now to the drawings and more particularly to FIG. 1, a flame holder system in accordance with an embodiment of the present invention is shown and is referenced generally by numeral 10. As will be explained further below, flame holder system 10 cooperates with an outboard end of 100A of a torch body 100 which is illustrated in dashed line form to indicate that torch body 100 is not part of the present invention or a limitation thereon, but rather the invention includes modifications made thereto. That is to say, as is well known in the art, torch body 100 transports gases to be burned during torch operation. As will be readily apparent, the present invention can be adapted to work with any size and/or configuration of torch body 100.

In the illustrated embodiment, flame holder system 10 includes a hollow flame holder 20 and retaining system elements 30 coupled to torch body 100. For clarity of illustration, flame holder 20 is not mounted on torch body 100. However, in use, flame holder 20 will be mounted and retained on torch body 100 as retaining system elements 30 cooperate with features on flame holder 20.

Flame holder 20 can be a hollow cylinder of ceramic material that fits on outboard end 100A and cooperates with retaining system elements 30 to provide for (i) quick connect/disconnect of flame holder 20 to torch body 100, and (ii) retention of flame holder 20 on torch body 100. For high temperature operation, it is advantageous that the ceramic material be a zirconium oxide cashable compound which has a service temperature of approximately 4000° F., is high in strength, and is resistant to thermal shock. The flame holder of the present invention is typically casted (as opposed to being mailed) due to its relatively small size. A suitable zirconium oxide castable compound is RESCORE 760, available commercially from Cotronics Corporation, Brooklyn, N.Y. However, it should be understood that the instant invention could be used with flame holders made from other suitable materials as well. Thus, for example, flame holders made from stainless steel or cast iron are within the scope of the present invention.

Before describing the features of flame holder 20 that allow it to mount and be retained on torch body 100, it is appropriate to describe retaining system elements 30, which will be done while referring to FIGS. 1 and 2. In the illustrated embodiment, retaining system elements 30 comprise two modifications to torch body 100 and one part. More specifically, the two modifications are a stop 32 fixedly coupled to torch body 100 and two pins 34 fixedly coupled to torch body 100 and extending radially outward therefrom. Stop 32 can be a continuous annular flange (as shown) or can be realized by a plurality of discontinuous stops distributed circumferentially about torch body 100 without departing from the scope of the present invention. Radially-extending pins 34 are used to mount and retain flame holder 20 on outboard end 100A.

While the illustrated embodiment uses two pins 34 that are positioned on torch body 100 in diametric opposition to one another, more or less than two pins 34 could be used without departing from the scope of the present invention. For example, a single pin 34 could be used for horizontal or stationary torch applications. If two or more pins 34 are used, they can be (but not need be) symmetrically disposed about torch body 100. Indeed, non-symmetric placement of pins 34 could be used to insure proper positioning/attachment of a flame folder. Methods for attaching stop 32 and pins 34 to torch body 100 (or incorporating them into torch body 100) would be well understood In the art. As illustrated in FIG. 1, retaining system elements 30 also include a spring 36 disposed about torch body 100 between stop 32 and pins 34. Spring 36 provides a positive retaining force on flame holder 20 as will be described further below.

Referring additionally now to the cross-sectional view of flame holder 20 in FIG. 3, the features of flame holder 20 are shown that allow it to be quickly connected/disconnected to torch body 100 and retained on torch body 100. These features are provided at one end 20A of flame holder 20 that will be fitted over outboard end 100A. More specifically, the Inside wall 22 of frame holder 20 has two grooves formed therein where the grooves correspond in number and position to pins 34. Thus, in the illustrated embodiment, the two grooves are in diametric opposition to one another on inside wall 22. Accordingly, in FIG. 3, only one of these grooves (i.e., groove 24) is visible. Since each groove 24 is the same, a description of one will be sufficient to provide an understanding of the present invention, Groove 24 is open at its end 24A that is aligned with end 20A. Groove 24 is sized to receive one of pins 34 therein when end 24A is aligned with one of pins 34. Groove 24 extends from end 24A axially along flame holder 20 to a first 90° turn 24B, and then extends along a path 24C formed in inside wall 22 to a second 90° turn 24D before terminating at an end 24E that does not extend as far as starting end 24A. Thus, each groove 24 can define a substantially U-shaped path. However, it is to be understood that each groove could be realized by a more tortious path having additional turns and that the individual segments of groove 24, including the segment from the final turn to the end 24E, can be of varying lengths, without departing from the scope of the present invention.

Additionally, in at least one embodiment, in order to provide that the burner is only properly assembled in a certain manner or direction (e.g., to require "clocking" during assembly), two or more grooves (and corresponding pins) can be of different depths (and pin lengths). This embodiment would be advantageous, for example, to ensure that specifically designed azimuthal or radial features in a particular flame holder are always preserved when the burner is assembled. Additionally, the turns do not necessarily need to be 90° nor at the same angles. However, as would be easily understood, if more than one groove 24 exists than the grooves would need to substantially match one another for ease in assembly, and it would remain advantageous that the final segment of groove 24, from the final turn to the end 24E be substantially parallel to the center line of the burner in order to assure proper retention of the pin 34 against end 24E.

In the illustrated embodiment, grooves 24 are configured so that once flame holder 20 is positioned on outboard end 100A with end 20A compressing spring 36 until pins 34 rest in first turn 24B, flame holder 20 can be rotated with each pin 34 riding along a corresponding path portion (or segment) 24C until second turn 24D is encountered. At this point, the force of spring 36 is allowed to apply an axial force to flame holder 20 thereby causing each pin 34 to come to rest against a corresponding end 24E. When spring 36 is used, symmetric placement of pins 34 is preferred for load distribution. The internal diameter of flame holder 2G can vary (e.g., be tapered, stepped, stepped and tapered, etc.) in a variety of ways without departing from the scope of the present invention. For example, as shown in the FIG. 3 embodiment, the internal diameter is constant along region 20B, stepped at region 20C, and divergent along region 20D.

Although the present invention has been described using spring 36, it is to be understood that some applications (e.g., horizontal or stationary torches) of the present invention may not require a spring. Accordingly, FIG. 4 illustrates an embodiment of the present invention that does not use a spring. That is, torch body 100 is modified only to include pins 34 while a flame holder 20 still has substantially U-shaped grooves 24 formed on inside wall 22 where grooves 24 are in correspondence with the position and number of pins 34 as described in the previous embodiment, i.e., FIG. 3.

The advantages of the present invention are numerous. The flame holder system provides for quick connect/disconnect of a flame holder and provides a long-lasting flame holder. Accordingly, the present invention satisfies two needs for the high-temperature torch applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A flame holder system, comprising:

A plurality of different-length catch pins adapted to be coupled to an outboard end of a torch body transporting combustible gases to the outboard end during a torch operation, each of said catch pins extending radially outward from the torch body;

a flame holder having an interior cavity extending therethrough from a first end to a second end thereof to define an inner wall with said first end adapted to fit over the outboard end of the torch body, said flame holder having a plurality of different-depth grooves formed in said inner wall, each of said grooves corresponding in depth and position to one of said catch pins, each of said grooves-starting at said first end and shaped to define at least two turns, wherein each said at least two turns is 90° such that each said groove is substantially U-shaped with a first segment having an open end and a final segment extending shorter than the first segment, and the first and final segments of each said groove being substantially parallel to a center line of said flame holder, each of said grooves sized to receive only a particular one of said catch pins therein when said flame holder is fitted over the outboard end of the torch body; and a spring-loaded stop including a spring disposed between said spring-loaded stop and said catch pins and adapted to be coupled to the torch body for engaging said first end of said flame holder fitted over the outboard end of the torch body, and wherein the final segment of each of said grooves of said flame holder engages only a particular one of said catch pins when said spring applies a force axially to said flame holder to thereby retain said flame holder on the torch body.

2. A flame holder system as in claim 1 wherein said catch pins comprise two catch pins that are substantially diametrically opposed to one another on the torch body.

3. A flame holder system as in claim 1 wherein said flame holder is made from one of a ceramic or metallic material.

4. A flame holder system as: in claim 1 wherein an inner diameter of said flame holder varies between said first end and said second end.

5. A flame holder system as in claim 1 wherein said flame holder is made from a zirconium oxide castable compound.

6. A flame holder system, comprising:
   at least two different-length catch pins adapted to be coupled to an outboard end of a torch body transporting combustible gases to the outboard end during a torch operation, said catch pins extending radially outward from the torch body;
   a zirconium oxide castable compound flame holder bored therethrough from a first end to a second end thereof to define an inner wall with said first end adapted to fit over the outboard end of the torch body, said flame holder having at least two grooves formed in said inner wall, wherein said grooves correspond in number, depth and positioning to said catch pins with each of said grooves starting at said first end and traversing a path that includes two 90° turns wherein each of said grooves is substantially U-shaped with a first segment having an open end and a final segment extending shorter than the first segment. and the first and final segments of each of said grooves being substantially parallel to a center line of said flame holder, each of said grooves sized to receive a particular one of said catch pins therein when said flame holder is fitted over the outboard end of the torch body with said grooves being aligned with said catch pins; and
   a spring-loaded stop including a spring disposed between said spring-loaded stop and said catch pins and adapted to be coupled to the torch body for engaging said first end of said flame holder fitted over the outboard end of the torch body, and wherein the final segment of each of said grooves of said flame holder engages only a particular one of said catch pins, said spring applying a force axially to said flame holder to thereby retain said flame holder on the torch body.

7. A flame holder system as in claim 6 wherein said at least two catch pins comprises two catch pins that are diametrically opposed to one another on the torch body.

\* \* \* \* \*